United States Patent
Briesenick et al.

(10) Patent No.: US 6,524,065 B2
(45) Date of Patent: Feb. 25, 2003

(54) INTERMEDIATE-STAGE SEAL ARRANGEMENT

(75) Inventors: Jan Briesenick, Berlin (DE); Winfried-Hagen Friedl, Berlin (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 09/836,536

(22) Filed: Apr. 18, 2001

(65) Prior Publication Data
US 2002/0004006 A1 Jan. 10, 2002

(30) Foreign Application Priority Data
Apr. 19, 2000 (DE) .......................... 100 19 440

(51) Int. Cl.$^7$ ............................... F01D 11/02
(52) U.S. Cl. ................. 415/173.7; 415/174.4; 415/174.5; 415/209.3
(58) Field of Search ............. 415/173.4, 173.5, 415/174.5, 174.4, 209.3, 173.7

(56) References Cited

U.S. PATENT DOCUMENTS

| | | | | |
|---|---|---|---|---|
| 3,807,891 A | * | 4/1974 | McDow et al. | 415/116 |
| 4,767,267 A | * | 8/1988 | Salt et al. | 415/174 |
| 4,834,613 A | * | 5/1989 | Hansen et al. | 415/160 |
| 6,220,815 B1 | * | 4/2001 | Rainous et al. | 415/174.5 |
| 6,309,177 B1 | * | 10/2001 | Swiderski et al. | 415/173.2 |

FOREIGN PATENT DOCUMENTS

GB 2 222 856 3/1990

* cited by examiner

Primary Examiner—Edward K. Look
Assistant Examiner—Ninh Nguyen
(74) Attorney, Agent, or Firm—The Law Offices of Timothy J. Klima

(57) ABSTRACT

An intermediate-stage seal carrier for a high-pressure jet-engine turbine includes a supporting area for vane retainers, wherein the supporting area includes only one annular wall upstream of and abutting the vane retainers.

28 Claims, 4 Drawing Sheets

INTERMEDIATE-STAGE SEAL ARRANGEMENT

BACKGROUND OF THE INVENTION

This invention relates to an intermediate-stage seal carrier of a high-pressure jet-engine turbine, said seal carrier having a supporting area for vane retainers.

In particular in the case of high-pressure turbines, appropriate means must be provided for creating a seal between a rotor and a stator. Therefore, the area upstream of the second turbine stage is of particular interest as regards the present invention. In accordance with prior art, an intermediate-stage seal carrier is attached at the radially inward end areas of the vanes. Said intermediate-stage seal carrier is suitably designed in such a way to conduct the air, which is also used for sealing, from an intermediate disc area into the area between the stator and the rotor.

In the solution according to the state of the art, an intermediate-stage seal carrier is located freely movable relative to the vanes by way of a spoke-type centering arrangement. This arrangement provides for thermal and stress characteristics of the seal carrier and, in consequence, the seal between stator and rotor which are superior to those of other, firmly bolted or riveted solutions according to the state of the art. For free movability, axial clearance must be provided between the vane retainers and the intermediate-stage seal carrier. This clearance is liable to incur sealing problems and leakage. Therefore, sealing between the vane retainers and the intermediate-stage seal carrier is accomplished by way of a groove, this groove being provided on the outer circumference of the intermediate-stage seal carrier. Said groove comprises an upstream and a downstream wall between which the individual vane retainers are inserted. In this arrangement, a line contact is formed between the vane retainers and the circumferential annular groove. According to prior art, the line contact can occur at the upstream or at the downstream side of the groove, i.e. at the upstream or at the downstream wall, depending upon the pressure differential prevailing across the intermediate-stage seal carrier in the intermediate disc area. Furthermore, the design known from prior art provides for a secondary sealing effect by way of a small gap between the vane retainers and the groove, should the line-contact force not be sufficient to ensure an adequate sealing effect.

Therefore, it is irrelevant whether the direction of the pressure force changes or the pressure force is very small. This arrangement is mainly used for low-pressure turbines, where the pressure differentials are only minor and subject to major variation. In the case of high-pressure turbines, however, higher pressure differentials may be encountered.

Specification GB 2 222 856 A describes a sealing arrangement of a gas turbine in which a seal carrier is firmly attached by means of bolting, riveting or in another manner. Accordingly, the sealing effect between a vane retainer and an intermediate-stage seal carrier is accomplished by the fasteners and a non-positive/positive lock between the vane retainer and a single wall of the intermediate-stage seal carrier. Hence, a different technical principle is applied in which neither a spoke-type centering arrangement nor a further, second annular wall is required.

A disadvantage of the known design lies in the high effort which is necessary to produce the annular groove with a high accuracy of fit. To achieve this accuracy, the intermediate-stage seal carrier must be machined mechanically in a suitable manner. This incurs high production costs.

A further, major disadvantage arises from the assembly or installation of the vanes to the intermediate-stage seal carrier. Since the fitting tolerances of the groove are very close, high accuracy of fit must be ensured for the installation of the vane retainers.

A further disadvantage is the relatively high total mass.

BRIEF SUMMARY OF THE INVENTION

In a broad aspect, the arrangement of the present invention provides an intermediate-stage seal carrier of the said design which provides reduced mass and simple and cost-effective manufacture as well as reliable operation and long life.

In accordance with the present invention the solution to the said problem is provided by the features cited in the main claim. Further advantageous embodiments will become apparent from the subclaims.

It is a particular object of the present invention to provide a supporting area with a single annular wall upstream of the vane retainers, with the said annular wall abutting the vane retainers.

The design embodiments in accordance with the present invention provide various, significant benefits.

The intermediate-stage seal carrier thus features only one upstream annular wall which provides for the sealing between the vane retainers and the intermediate-stage seal carrier. It was found that the pressure differential across the intermediate-stage seal carrier will always be high on the high-pressure turbine considered herein and that the said high pressure differential will permanently provide for a sufficiently high pressure force against the vane retainers in operation. Accordingly, the upstream annular wall will always be pressed against the vane retainers. Said pressure differential, which is in the range of six bar for example, has proved to be sufficient to ensure reliable sealing in a line-contact area.

The intermediate-stage seal carrier in accordance with the present invention will, therefore, ensure an adequate sealing effect with only one annular wall.

Since two walls and an interpositioned groove, as known from prior art, are omitted, the present invention provides for a considerable reduction in mass, which may lie in the range of 500 g for the intermediate-stage seal carrier.

Since the vane retainers need not be inserted into the narrow, close-tolerance fitting groove, the present invention also facilitates assembly to a considerable extent.

In accordance with the present invention, it is particularly advantageous when the upstream annular wall is provided with openings for the installation of locating pins. Said locating pins provide for fixation of the intermediate-stage seal to the vane retainers.

To ensure reliable fixation of the locating pins, it may be particularly favourable when mounting bosses are provided for the installation of the locating pins downstream of the vane retainer in the supporting area. Said bosses have no sealing function, but are used for mechanical fixation only. Consequently, they can be designed for low weight and their exteriors machined to no or only low standards of fit.

Since, according to the invention, the upstream annular wall abuts the vane retainers, only the abutting face of the annular wall must be machined dimensionally accurate. A close-tolerance fitting groove need not be produced.

This will lead to a considerable reduction in the manufacturing costs for the intermediate-stage seal carrier. In addition, the intermediate-stage seal carrier according to the present invention can simply be produced as a casting, whereas the solutions according to the state of the art mostly require extensive cutting machining effort.

BRIEF DESCRIPTION OF THE DRAWINGS

The invention is described in the light of the accompanying drawing showing an embodiment of the present invention. On the drawing.

DETAILED DESCRIPTION OF THE INVENTION

Figure 1:
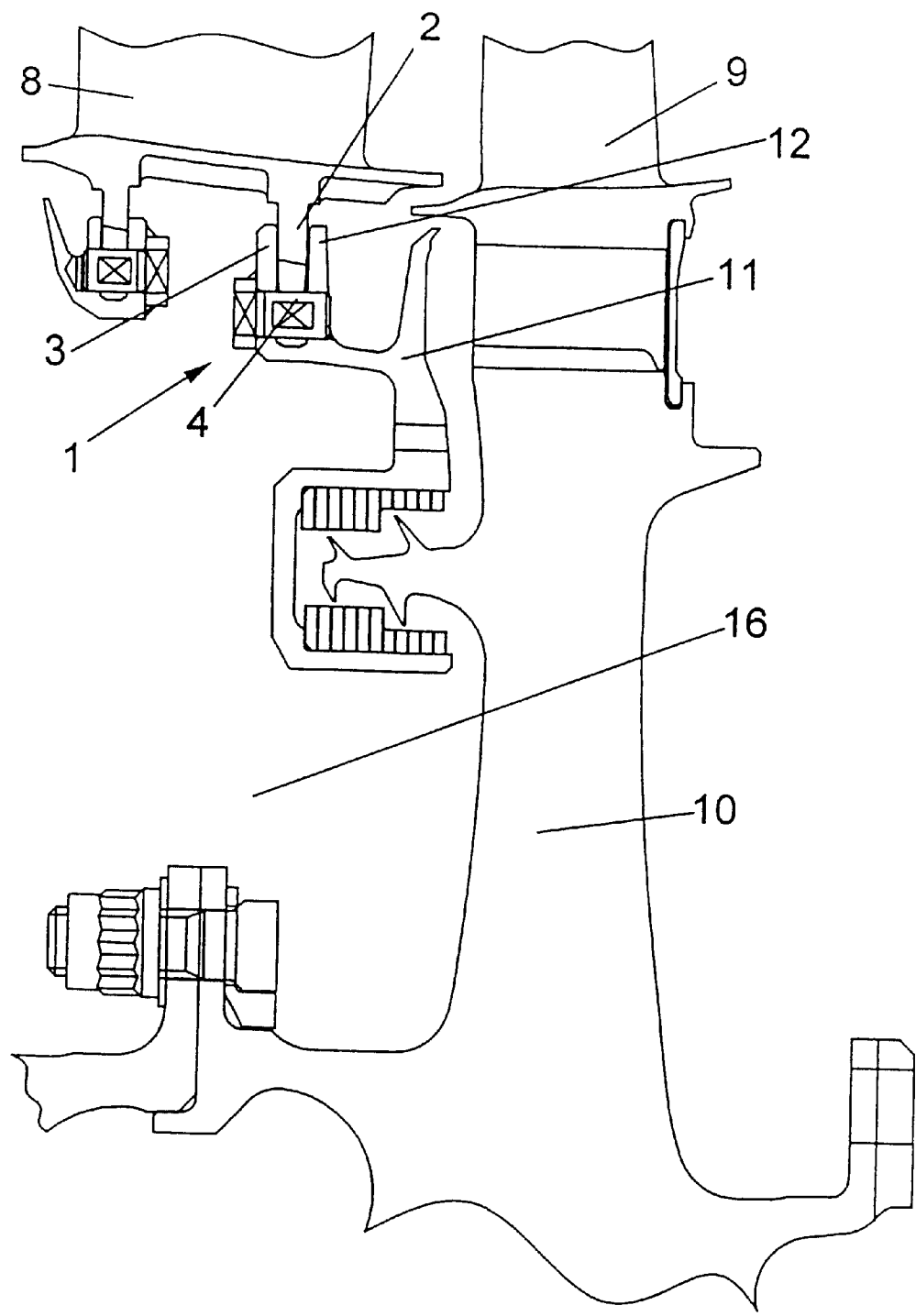
FIG. 1 is a simplified partial view of a vane retainer of a second stage of a high-pressure turbine in accordance with prior art.

FIG. 1 illustrates a partial area of a second stage of a high-pressure turbine. Only the radially inward root area of a stator is shown, said root area comprising a vane retainer 2 which extends circumferentially and has a square cross-section. Reference numeral 9 indicates the radially inward root area of a rotor blade which is attached to a turbine disc 10.

Figure 2:
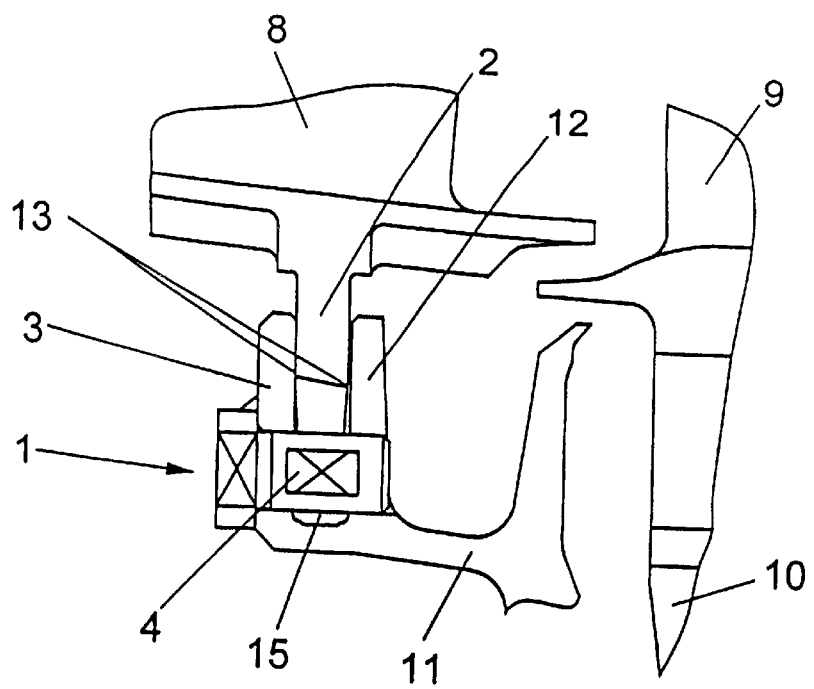
FIG. 2 is an enlarged detail view of the arrangement of the vane retainer shown in FIG. 1

An essentially annular intermediate-stage seal carrier 11 comprises a supporting area 1. For the location and fixation of the vane retainers 2, the arrangement of said intermediate-stage seal carrier known from prior art has an upstream annular wall 3 and a downstream annular wall 12, as illustrated in FIGS. 1 and 2. The annular walls 3 and 12 form a close-tolerance fitting groove into which the vane retainer 2 is inserted. This arrangement results in the line-contact areas 13 shown in FIG. 2.

The vane retainer 2 is held by means of several locating pins 4 that are distributed along the circumference.

A more detailed description of the arrangement of the intermediate-stage seal carrier 11 can be dispensed with since it is either irrelevant for the present invention or anticipated by prior art.

Figure 3:
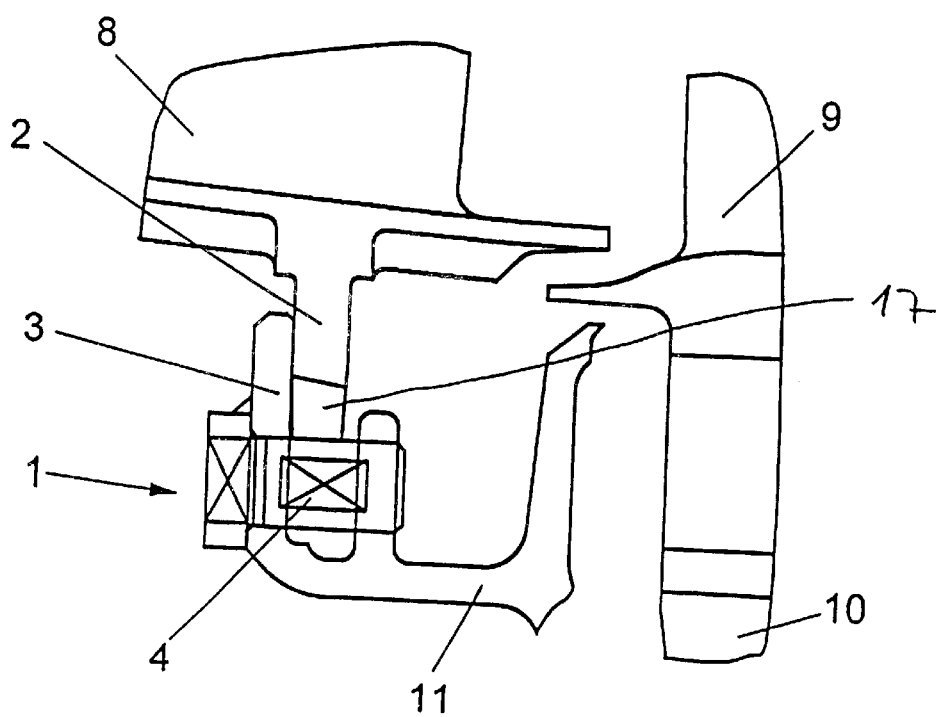
FIG. 3 is an enlarged detail view of the embodiment of the vane retainer in accordance with the present invention by analogy with FIG. 2.

FIG. 3 illustrates the arrangement of the intermediate-stage seal carrier 11 or its supporting area 1, respectively, in accordance with the present invention. The intermediate-stage seal carrier 11 in accordance with the present invention comprises only one upstream annular wall 3 which abuts the vane retainers 2.

Radial and circumferential fixation is achieved in the usual manner by means of the locating pins 4.

Figure 4:
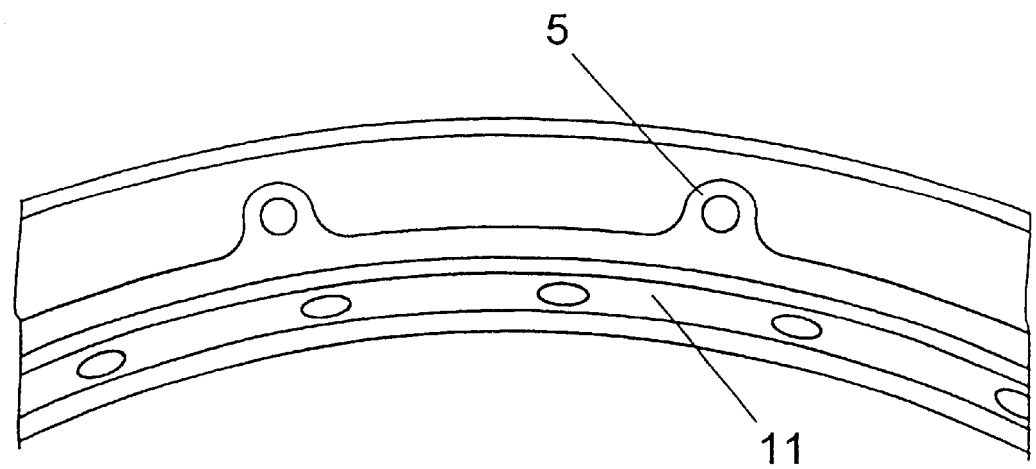
FIG. 4 is a partial side view of the vane retainer in accordance with the present invention.

Accordingly, the intermediate-stage seal carrier 11 is fixed radially during assembly or under conditions of vibration by means of the locating pins 4. Said pins are additionally retained at their downstream end by the bosses 5 provided on the intermediate-stage seal carrier 11, cf. FIG. 4 in particular.

Figure 5:
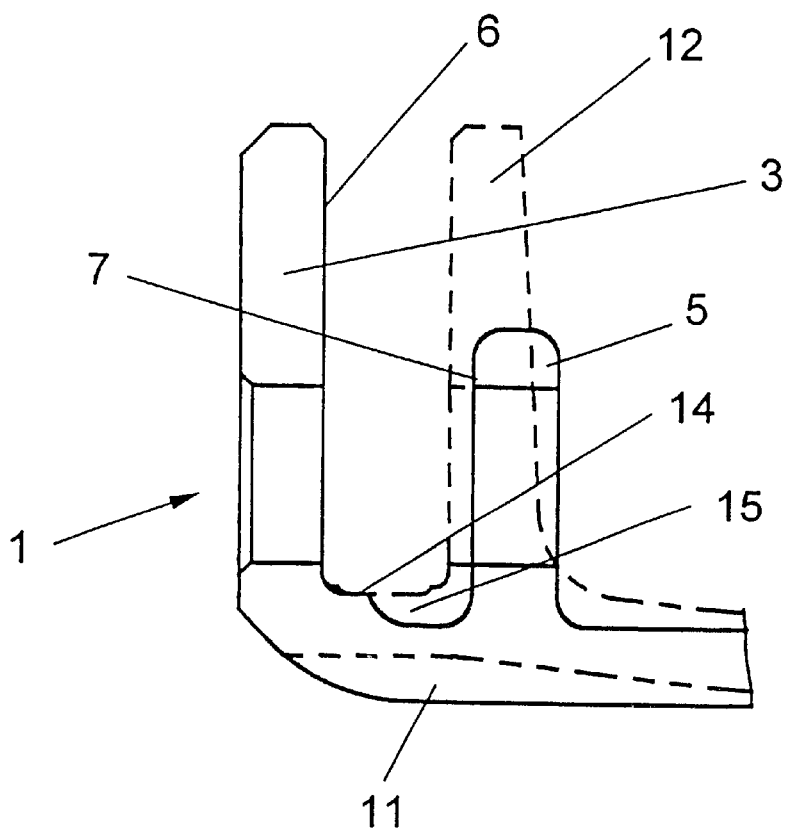
FIG. 5 is an enlarged representation of the annular wall of the vane retainer in accordance with the present invention in comparison with the arrangement known from prior art.

As illustrated in FIGS. 3 and 5, abutment of the vane retainers 2 is made at a downstream face 6 of the annular wall 3. Machining for accuracy of fit can, therefore, be limited to said downstream face 6, this machining also comprising part of the groove bottom 14, as illustrated in FIG. 5. The mechanically machined surfaces 6 and 14 join with a groove 15 produced by casting, for example.

As illustrated in FIG. 5, the distance between the downstream face 6 from an upstream face 7 of the boss 5 is larger than in the arrangement according to prior art allowing for a tolerance which will facilitate manufacture and assembly. For comparison, the downstream annular wall 12 in accordance with prior art is depicted by a broken line in FIG. 5.

Figure 6:
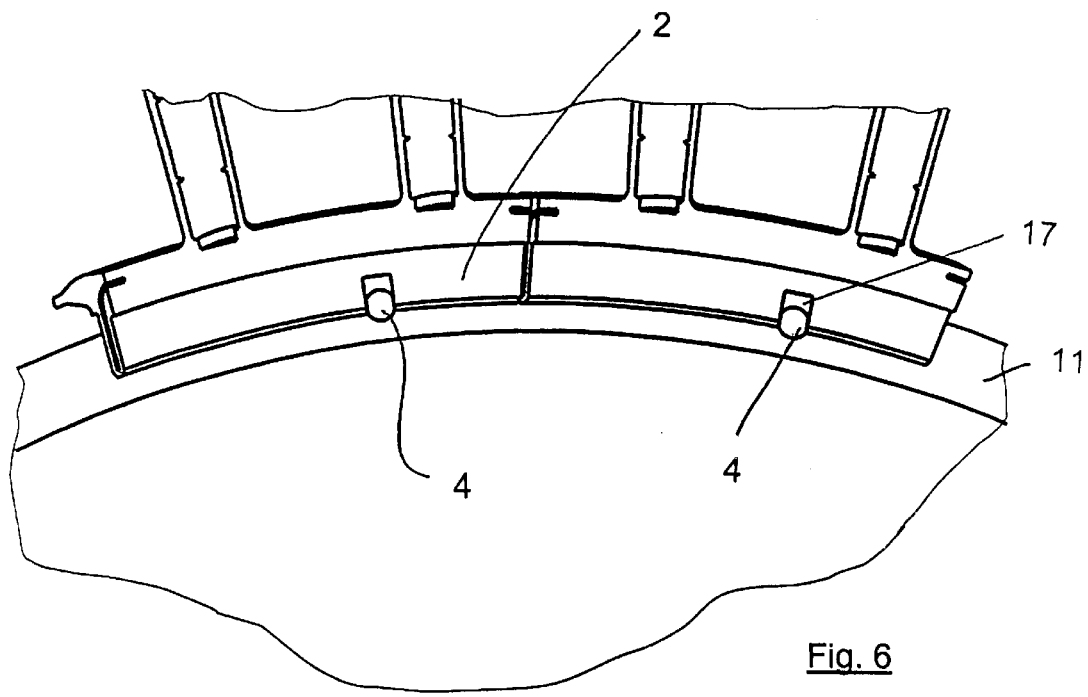
FIG. 6 is a partial sectional view of the arrangement shown in FIG. 3, in a plane normal to the plane of illustration of FIG. 3.
Figure 7:
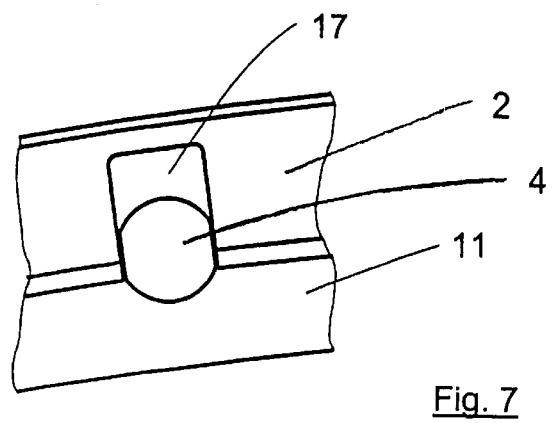
FIG. 7 is an enlarged detail view of the locating pin shown in FIG. 3.

FIG. 6 shows a sectional view in a plane normal to the plane of illustration which refers to the representation in FIG. 3. As becomes apparent, radial slots 17 are provided in the vane retainers 2 in which the locating pins 4 are radially movable. The representation in FIG. 7, in particular, shows that the sides of the locating pins 4 are provided with a face on both sides to locate the locating pin 4 in the slot with precision of fit. This radially movable locating arrangement, which is also termed spoke-type centering arrangement, provides for improved thermal and stress characteristics of the seal carrier and, in consequence, a better seal between stator and rotor. Accordingly, this arrangement is a radially freely movable spoke-centering type centering arrangement. The centering of the intermediate-stage seal carrier 11 is accomplished by an appropriate number of locating pins 4.

It will be appreciated that the invention can be allowed to differ considerably from the one embodiment illustrated without departing from the inventive concept expressed.

In summary, this invention relates to an intermediate-stage seal carrier for a high-pressure jet-engine turbine, said intermediate-stage seal carrier being provided with a supporting area 1 for vane retainers, characterized in that the supporting area 1 comprises only one annular wall 3 upstream of and abutting the vane retainers 2.

What is claimed is:

1. An intermediate-stage seal arrangement for a high-pressure turbine of a jet-engine having vane retainers which include upstream and downstream faces, comprising:

an intermediate-stage seal carrier including a supporting area for the vane retainers, the supporting area comprising an annular wall positioned upstream of the vane retainers for engaging the vane retainers; and a locating mechanism for movably radially locating the intermediate-stage seal carrier with respect to the vane retainers;

wherein the intermediate-stage seal carrier and locating mechanism engage only the upstream one of the upstream and downstream faces of the vane retainers.

2. An intermediate-stage seal arrangement in accordance with claim 1, wherein the upstream annular wall includes openings for receiving locating pins of the locating mechanism.

3. An intermediate-stage seal arrangement in accordance with claim 2, wherein the vane retainers include slots for receiving and allowing radial movement of the locating pins with respect to the vane retainers.

4. An intermediate-stage seal arrangement in accordance with claim 3, wherein the slots are elongated and radially aligned with radially inner ends of the slots being open-ended.

5. An intermediate-stage seal arrangement in accordance with claim 2, wherein the supporting area includes at least one boss positioned downstream of the vane retainers for receiving the locating pins.

6. An intermediate-stage seal arrangement in accordance with claim 5, wherein a distance between a downstream face of the annular wall and an upstream face of the at least one boss is greater than a thickness of the vane retainers to provide an axial clearance between the vane retainers and the supporting area.

7. An intermediate-stage seal arrangement in accordance with claim 6, wherein, of the downstream face of the annular wall and the upstream face of the at least one boss, only the downstream face of the annular wall is produced by machining.

8. An intermediate-stage seal arrangement in accordance with claim 5, wherein the vane retainers include slots for receiving and allowing radial movement of the locating pins with respect to the vane retainers.

9. An intermediate-stage seal arrangement in accordance with claim 8, wherein the slots are elongated and radially aligned with radially inner ends of the slots being open-ended.

10. An intermediate-stage seal arrangement in accordance with claim 1, wherein the intermediate-stage seal carrier is a casting.

11. An intermediate-stage seal arrangement in accordance with claim 1, wherein in the supporting area only a downstream face of the annular wall is produced by machining.

12. An intermediate-stage seal arrangement for a high-pressure turbine of a jet-engine having vane retainers, comprising:

an intermediate-stage seal carrier including a supporting area for the vane retainers, the supporting area comprising a single annular wall positioned upstream of the vane retainers for radially movably engaging the vane retainers; wherein in the supporting area only a downstream face of the annular wall is produced by machining.

13. An intermediate-stage seal arrangement for a high-pressure turbine of a jet-engine having vane retainers which include upstream and downstream faces, comprising:

an intermediate-stage seal carrier including a portion positioned upstream of the vane retainers for engaging the vane retainers; and a locating mechanism for movably radially locating the intermediate-stage seal carrier with respect to the vane retainers;

wherein the intermediate-stage seal carrier and locating mechanism engage only the upstream one of the upstream and downstream faces of the vane retainers.

14. An intermediate-stage seal arrangement in accordance with claim 13, wherein the upstream portion of the intermediate-stage seal carrier is in the form of an annular wall which includes openings for receiving locating pins of the locating mechanism.

15. An intermediate-stage seal arrangement in accordance with claim 14, wherein the intermediate-stage seal carrier includes at least one boss positioned downstream of the vane retainers for receiving the locating pins.

16. An intermediate-stage seal arrangement in accordance with claim 15, wherein a distance between a downstream face of the annular wall and an upstream face of the at least one boss is greater than a thickness of the vane retainers.

17. An intermediate-stage seal arrangement in accordance with claim 16, wherein the intermediate-stage seal carrier is a casting.

18. An intermediate-stage seal arrangement in accordance with claim 17, wherein, of the downstream face of the annular wall and the upstream face of the at least one boss, only the downstream face of the annular wall is produced by machining.

19. An intermediate-stage seal arrangement in accordance with claim 14, wherein the vane retainers include slots for receiving and allowing radial movement of the locating pins with respect to the vane retainers.

20. An intermediate-stage seal arrangement in accordance with claim 19, wherein the slots are elongated and radially aligned with radially inner ends of the slots being open-ended.

21. An intermediate-stage seal arrangement for a high-pressure turbine of a jet-engine having vane retainers which include upstream and downstream faces, comprising:

an intermediate-stage seal carrier including a portion positioned upstream of the vane retainers for radially movably engaging only the upstream one of the upstream and downstream faces of the vane retainers in a sealing engagement; the sealing engagement being maintained solely by a pressure differential across the intermediate-stage seal carrier.

22. An intermediate-stage seal arrangement in accordance with claim 21, wherein the upstream portion of the intermediate-stage seal carrier is in the form of an annular wall which includes openings for receiving locating pins.

23. An intermediate-stage seal arrangement in accordance with claim 22, wherein the intermediate-stage seal carrier includes at least one boss positioned downstream of the vane retainers for receiving the locating pins.

24. An intermediate-stage seal arrangement in accordance with claim 23, wherein a distance between a downstream face of the annular wall and an upstream face of the at least one boss is greater than a thickness of the vane retainers to provide an axial clearance between the vane retainers and the respective faces.

25. An intermediate-stage seal arrangement in accordance with claim 24, wherein the intermediate-stage seal carrier is a casting.

26. An intermediate-stage seal arrangement in accordance with claim 25, wherein, of the downstream face of the annular wall and the upstream face of the at least one boss, only the downstream face of the annular wall is produced by machining.

27. An intermediate-stage seal arrangement in accordance with claim 22, wherein the vane retainers include slots for receiving and allowing radial movement of the locating pins with respect to the vane retainers.

28. An intermediate-stage seal arrangement in accordance with claim 27, wherein the slots are elongated and radially aligned with radially inner ends of the slots being open-ended.

* * * * *